United States Patent [19]

Busse et al.

[11] Patent Number: 4,921,368

[45] Date of Patent: May 1, 1990

[54] FASTENING OF A SEALING BELLOWS TO THE JOINT HOUSING OF A BALL JOINT

[75] Inventors: Fritz Busse, Hilden; Hans Hafeneger, Düsseldorf; Ulrich Mette, Essen, all of Fed. Rep. of Germany

[73] Assignee: TRW Ehrenreich GmbH & Co. KG, Dusseldorf, Fed. Rep. of Germany

[21] Appl. No.: 280,834

[22] Filed: Dec. 7, 1988

[30] Foreign Application Priority Data

Dec. 7, 1987 [DE] Fed. Rep. of Germany ....... 3741347

[51] Int. Cl.$^5$ ............................................. F16C 11/00
[52] U.S. Cl. ...................................... 403/134; 403/50; 277/212 FB
[58] Field of Search ........................... 403/134, 50, 51; 277/212 FB

[56] References Cited

U.S. PATENT DOCUMENTS

| | | | |
|---|---|---|---|
| 2,496,839 | 2/1950 | Abramoska. | |
| 3,460,650 | 8/1969 | Biabaud | 277/212 FB |
| 3,490,343 | 1/1970 | Afanador et al. | 403/51 |
| 4,345,772 | 8/1982 | Woody et al. | 277/212 FB |
| 4,580,921 | 4/1986 | Broszat et al. | 403/134 |

FOREIGN PATENT DOCUMENTS

| | | |
|---|---|---|
| 3339874 | 6/1985 | Fed. Rep. of Germany . |
| 1181900 | 2/1970 | United Kingdom . |
| 2158892 | 11/1985 | United Kingdom ......... 277/212 FB |

Primary Examiner—Andrew V. Kundrat
Attorney, Agent, or Firm—Tarolli, Sundheim & Covell

[57] ABSTRACT

To seal a ball joint, a sealing bellows (3) with a bead (6) is fastened to the joint housing (1). The bead (6) is located in an L-shaped recess (4) of the joint housing (1) and is partially enclosed by an outer annular portion (8) of a retaining ring (5) deformed radially inward while an inner circular portion (7) of the retaining ring (5) engages an end surface (8) of the recess (4). To fix the sealing bellows (3) to the housing (1) in a single work step, there is machined in a cylindrical surface (12) of the L-shaped recess (4), a ring groove (11) which is engaged by an inner edge portion (10) of the inner circular portion (7) of the retaining ring (5). A tool (14) with a conical surface (15) is used for deforming of the retaining ring (5) which is advanced axially against the retaining ring (5), and the latter encloses the bead (6).

9 Claims, 2 Drawing Sheets

FASTENING OF A SEALING BELLOWS TO THE JOINT HOUSING OF A BALL JOINT

The invention relates to means for fastening a sealing bellows to the joint housing of a ball joint in which the sealing bellows has a bead received in an L-shaped recess formed by a cylindrical surface and an annular end surface on the outer rim of a housing opening, and which bead is partially enclosed by an outer annular portion of a retaining ring which is bent radially inward and which retaining ring also has an inner circular portion which lies against the end annular surface of the L-shaped recess.

The invention also relates to a method of fastening a sealing bellows to the joint housing of a ball joint in which a bead of the sealing bellows is placed in an L-shaped recess formed by a cylindrical surface and an annular end surface, and is fixed in the recess by deforming around it an outer annular portion of a retaining ring.

German Patent No. 3,339,874 discloses fastening of a sealing bellows to the joint housing of a ball joint, in which a bead of the sealing bellows is received in an axial recess on the outer rim of a housing opening. The fastening of the sealing bellows is effected by a retaining ring having an L-shaped cross section and located in the recess and fastened therein. The cylindrical outer wall of the retaining ring is deformed radially inward around the bead for holding the same. To fasten the retaining ring to the joint housing, the flat bottom of the recess has a circumferential ring step, lying radially inward and having segmented-shaped projections extending therefrom. By this structure, the retaining ring is fixed in the recess. Although in this case the sealing bellows is held securely, this fastening method is costly, since two finishing steps are necessary. In a first step, the retaining ring is secured to the housing by wedging. In a second step, the bead is enclosed by deforming the retaining ring.

U.S. Pat. No. 2,496,839 discloses fastening of a sealing bellows to the joint housing of a ball joint, in which a circumferential L-shaped groove is formed in the rim of the housing opening on the one hand, and the sealing bellows is fastened to the housing with a retaining ring having an inverse L-shaped cross section and received in the recess and fastened therein. The retaining ring may, for example, be fastened to the joint housing by welding, which means an additional production step.

The object of the invention is to provide a technologically improved fastening of a sealing bellows to a joint housing which is rapid and secure. In particular, the fastening should be possible in a single work step.

To achieve the above-mentioned object, it is proposed to form in the cylindrical surface of the L-shaped recess a circumferential ring groove adjacent to the annular end surface and which ring groove is engaged by an inner edge portion of the inner circular portion of the retaining ring.

As to the process, it is also proposed that, at the beginning of assembly, the retaining ring is placed in the recess in such a manner that the inner circular portion thereof extends at an acute angle to the annular end surface of the recess and engages the annular end surface. Then, the outer end portion of the outer annular portion of the retaining ring is engaged by a conical surface of a tool facing the joint housing and the outer annular portion is deformed about the bead.

The important idea of the invention is to form the recess and retaining ring so that, in a single work step, by appropriate deformation of the retaining ring the retaining ring, on the one hand, engages the ring groove and in this way is fixed to the joint housing, and, on the other hand, sealingly encloses the bead.

In one embodiment of the invention, the material of the bead projects partially into the ring groove. This feature may be realized, in particular, by making the ring groove sufficiently large. This feature also offers the advantage in that the bead is held, not only on its outer side by the outer annular portion of the retaining ring, but also on its inner side, since the material of the bead projecting into the ring groove provides an additional retaining force. Also, the sealing between the joint housing and the bead is improved.

In another embodiment of the invention, it is proposed that the outer annular portion of the retaining ring which grips around the bead be turned outward all around at its outer end portion. As to the process, it is proposed that, in the deforming of the retaining ring, the outer end portion of the outer annular portion be turned outward all around by a conical surface. In this way, the danger of damaging of the sealing bellows upon deformation of the retaining ring is avoided.

Other details and advantages of the subject invention will appear from the description which follows with reference to respective drawings in which one preferred embodiment of the fastening is shown.

Figure 1:
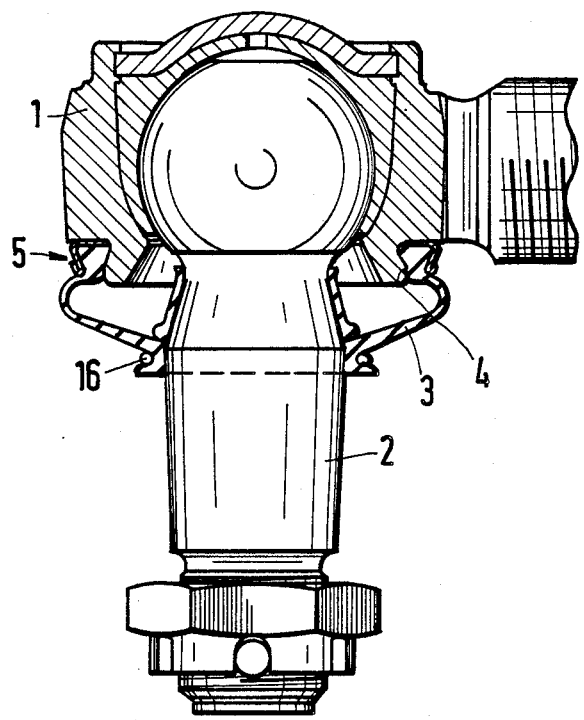
FIG. 1 shows a partial sectional side view of a ball joint.

The ball joint shown comprises a joint housing 1, a ball stud 2 arranged therein, and a sealing bellows 3 which is fastened at its ends both to the joint housing 1 and the ball stud 2.

The lower rim of the joint housing 1 has a circumferential, approximately L-shaped recess 4 which is surrounded by a retaining ring 5. The retaining ring 5 grips around a bead 6, which forms the housing-side rim of the sealing bellows 3.

Figure 3:
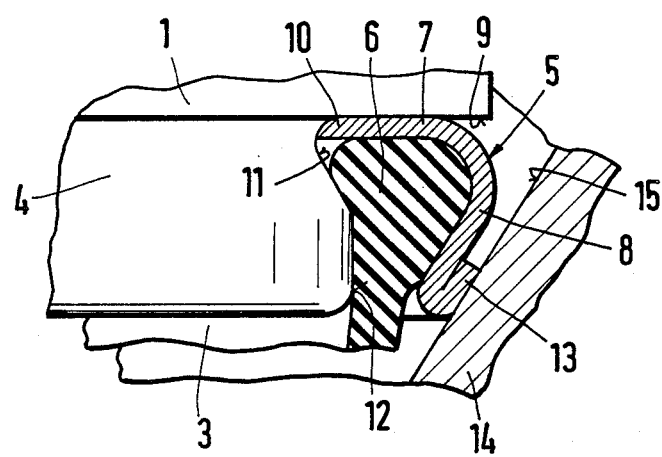
FIG. 3 shows a partial sectional view of the retaining ring, already deformed and enclosing the bead with the tool still lying against the retaining ring.

FIG. 3 shows that the retaining ring 5 consists of an inner circular portion 7 and an outer annular portion 8. The inner circular portion 7 lies against annular end surface 9 of the joint housing axially limiting the recess. The inner circular portion 7 has an inner edge 10 projecting into a ring groove 11 machined in the cylindrical surface 12 of the L-shaped recess 4. The ring groove 11 lies adjacent to the annular end surface 9. The ring groove 11 may be formed with an ordinary turning tool equipped with rotatable cutting plates spaced 60°. Upon turning, the turning tool is positioned adjacent the end surface 9 and then is radially advanced into the cylindrical surface 12. The inner circular portion 7 of the retaining ring 5 is connected with the outer annular portion by a curved portion, and the two portions 7, 8 extend at an acute angle to each other. The outer annular portion 8 encloses the bead 6 from outside and has an outer end portion 13 which is bent over by 180°. Thus, the retaining ring 5 has no sharp edges which may damage the sealing bellows 3.

Therefore, in the assembled condition, the bead 6 is enclosed by both the inner circular portion 7 and also the outer annular portion 8 of the retaining ring 5 and sealingly engages the cylindrical surface 12 with the inner surface of the bead. The bead 6 projects partially into the ring groove 11.

Figure 2:
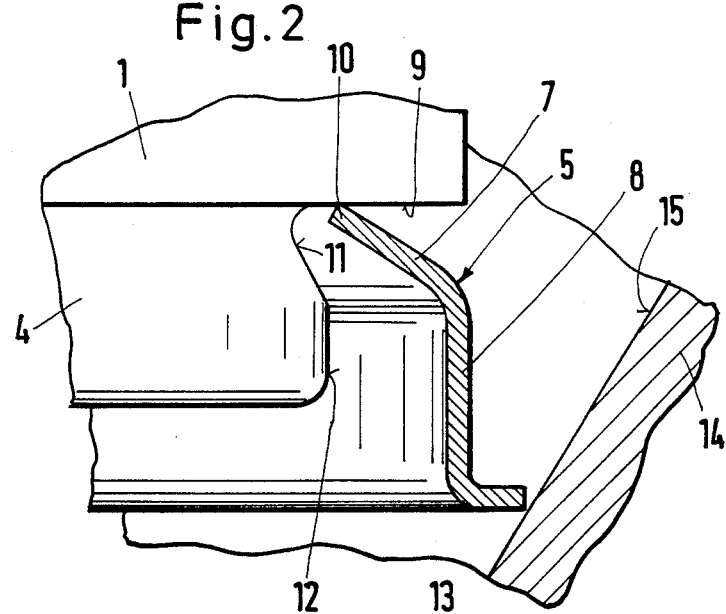
FIG. 2 shows a partial sectional view of a still undeformed retaining ring engaging the joint housing and conical surface of a tool used for deforming the retaining ring.

FIG. 2 shows the cross-section of the retaining ring 5 in an intermediate condition in which the inner circular portion 7 extends at an acute angle to the outer annular portion 8, and the outer end portion 13 extends radially outward. In a first assembling step, the inner edge 10 of the retaining ring 5 engages the end surface 9, while (not shown in FIG. 2) the bead 6 of the sealing bellows 3 is already placed into the retaining ring 5. In the next assembling step, a tool 14 having a conical surface 15 facing the joint housing 1, is applied against the outer end portion 13 of the retaining ring 5. The tool 14 is moved axially in the direction of the joint housing 1 to bend the retaining ring 5 around the bead 6. Three deformations of the retaining ring take place. The inner circular portion 7 of the retaining ring 5 lies completely against the end surface 9, the inner edge 10 of the retaining ring is pushed into the ring groove 11, and the outer annular portion 8 of the retaining ring 5 is bent radially inward and encloses the bead 6. The outer end portion 13 of the retaining ring 5 is engaged directly by the conical surface 15 and is bent over by 180°, so that it lies against the outer annular portion 8. FIG. 3 shows this final stage of the deformation of the retaining ring 5.

As shown in FIG. 1, the fastening of the sealing bellows 3 to the ball stud 2 is effected with a clamping ring 16.

We claim:

1. Fastening for a sealing bellows to the joint housing of the ball joint in which the sealing bellows has a bead located in an L-shaped recess defined by a cylindrical surface and an annular end surface on the outer rim of a housing opening, and a retaining ring comprises an outer annular portion bent radially inward for gripping around the bead, and an inner circular portion lying against the annular end surface of the L-shaped recess, characterized in that a radially extending circumferential ring groove (11) is machined in the cylindrical surface (12) of the L-shaped opening (4) adjacent the end surface (9) and the inner circular portion (7) of the retaining ring (5) has an inner edge (10) extending into the ring groove (11).

2. Fastening according to claim 1, characterized in that the material of the bead (6) projects partially into the ring groove (11).

3. Fastening according to claims 1 or 2, characterized in that the outer annular portion (8) of the retaining ring (5) encloses the bead (6) and comprises an outer end portion (13) turned outward around the outer annular portion.

4. A method of fastening a sealing bellows to the joint housing of a ball joint, in which a bead of the sealing bellows is located in an L-shaped recess defined by a cylindrical surface and an annular end surface and is fixed therein by a retaining ring, the method comprising the steps of:

positioning an inner edge portion (10) of an inner circular portion (7) of the retaining ring (5) against the annular end surface (9) of the recess (4), the inner circular portion (7) of the retaining ring (5) extending at an acute angle relative to the annular end surface (9) of the recess (4);

engaging a conical surface of a tool facing the joint housing against an outer end portion (13) of an outer annular portion (8) of the retaining ring (5); and deforming the outer annular portion (8) of the retaining ring (5) about the bead (6) to enclose the bead (6) by operating the tool (14).

5. A method of claim 4 wherein the step of deforming the outer annular portion (8) of the retaining ring (5) includes turning outward the outer end portion (13) of the outer annular portion (8) of the retaining ring (5).

6. An apparatus comprising:

a ball joint housing having a cylindrical surface and an annular end surface projecting from said cylindrical surface, said cylindrical and annular end surfaces defining an annular recess;

said cylindrical surface having a radially extending circumferential ring groove formed therein and located adjacent said annular end surface;

a sealing bellows having a bead located in the recess defined by said cylindrical and annular end surfaces; and a retaining ring having an outer annular portion bent radially inward gripping around said bead, said retaining ring having an inner circular portion lying against said annular end surface, said inner circular portion of said retaining ring having an inner edge portion, said inner edge portion and a portion of said bead projecting at least partially into said radially extending circumferential groove and being gripped therein.

7. A ball joint comprising a sealing bellows fastened to the joint housing of the ball joint, the sealing bellows having a bead located in an L-shaped recess defined by a cylindrical surface and an annular end surface on the outer rim of a housing opening, and a retaining ring comprising an outer annular portion bent radially inward for gripping around the bead, and an inner circular portion lying against the annular end surface of the L-shaped recess, characterized in that said cylindrical surface has a circumferential ring groove therein adjacent said annular end surface, and the inner circular portion of the retaining ring has an inner edge engaging the ring groove.

8. A ball joint according to claim 7, characterized in that said bead has a portion projecting into said ring groove.

9. A ball joint according to claim 7, characterized in that said outer annular portion of said retaining ring comprises an outer end portion turned outward around of said outer annular portion.

* * * * *

UNITED STATES PATENT AND TRADEMARK OFFICE
CERTIFICATE OF CORRECTION

PATENT NO. : 4,921,368

DATED : May 1, 1990

INVENTOR(S) : Fritz Busse, Hans Hafeneger, and Ulrich Mette

It is certified that error appears in the above-identified patent and that said Letters Patent is hereby corrected as shown below:

Column 4, Line 49, Claim 7, Insert --radially extending-- before "circumferential"

Column 4, Line 51, Claim 7, after "edge" delete "engaging" and insert --extending into-- thereat.

Signed and Sealed this

Ninth Day of July, 1991

Attest:

HARRY F. MANBECK, JR.

Attesting Officer

Commissioner of Patents and Trademarks